United States Patent
Yee-Madera et al.

(10) Patent No.: US 6,625,131 B1
(45) Date of Patent: *Sep. 23, 2003

(54) SATELLITE COMMUNICATION MULTICAST PROCESSING TECHNIQUES USING MULTICAST REPLICATION AND OUTBOUND PROCESSING

(75) Inventors: Gefferie H. Yee-Madera, San Gabriel, CA (US); Darren R. Gregoire, Redondo Beach, CA (US); Scott M. Takahashi, Torrance, CA (US); Roland Y. Wong, Monrovia, CA (US); Zoltan Z. Stroll, Rancho Palos Verdes, CA (US)

(73) Assignee: Northrop Grumman Corporation, Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/407,416

(22) Filed: Sep. 29, 1999

(65) Prior Publication Data (65)

Related U.S. Application Data

(63) Continuation-in-part of application No. 09/236,682, filed on Jan. 25, 1999, now Pat. No. 6,240,075.

(51) Int. Cl.[7] .............................................. H04B 7/204
(52) U.S. Cl. ....................... 370/325; 455/428; 455/13.3
(58) Field of Search .............................. 370/325, 310.1, 370/395.2, 414, 316, 395; 455/12.1, 427, 428, 429, 431, 13.3, 13.1, 420

(56) References Cited

U.S. PATENT DOCUMENTS

| | | | | |
|---|---|---|---|---|
| 6,240,075 B1 | * | 5/2001 | Takahashi et al. | ........ 370/310.1 |
| 6,366,776 B1 | * | 4/2002 | Wright et al. | .............. 455/12.1 |
| 6,400,925 B1 | * | 6/2002 | Tirabassi et al. | ........... 455/12.1 |

* cited by examiner

Primary Examiner—Nay Maung
Assistant Examiner—Tilahun Gesesse
(74) Attorney, Agent, or Firm—McAndrews, Held & Malloy, Ltd.

(57) ABSTRACT

A satellite communication system which performs multicast switching on data cells. A switch 80 receives the data cells at a set of input ports IP1 and directs those including a multicast routing code to a first set of output ports OP2 or OP128. The switch 80 also directs data cells effectively omitting the multicast routing code to a second set of output ports OP1. One or more multicast replication modules 110, 130 are coupled to the first set of output ports and replicate data cells requiring multicast processing. During the processing, the multicast routing code is effectively omitted and the replicated cells are coupled to input ports IP2 or IP 128 so that the replicated data cells are transmitted to the second set of output ports OP1. An outbound processing module 100 is coupled to output ports OP1 for processing the data cells for transmission over a satellite downlink transmitter 104.

23 Claims, 1 Drawing Sheet

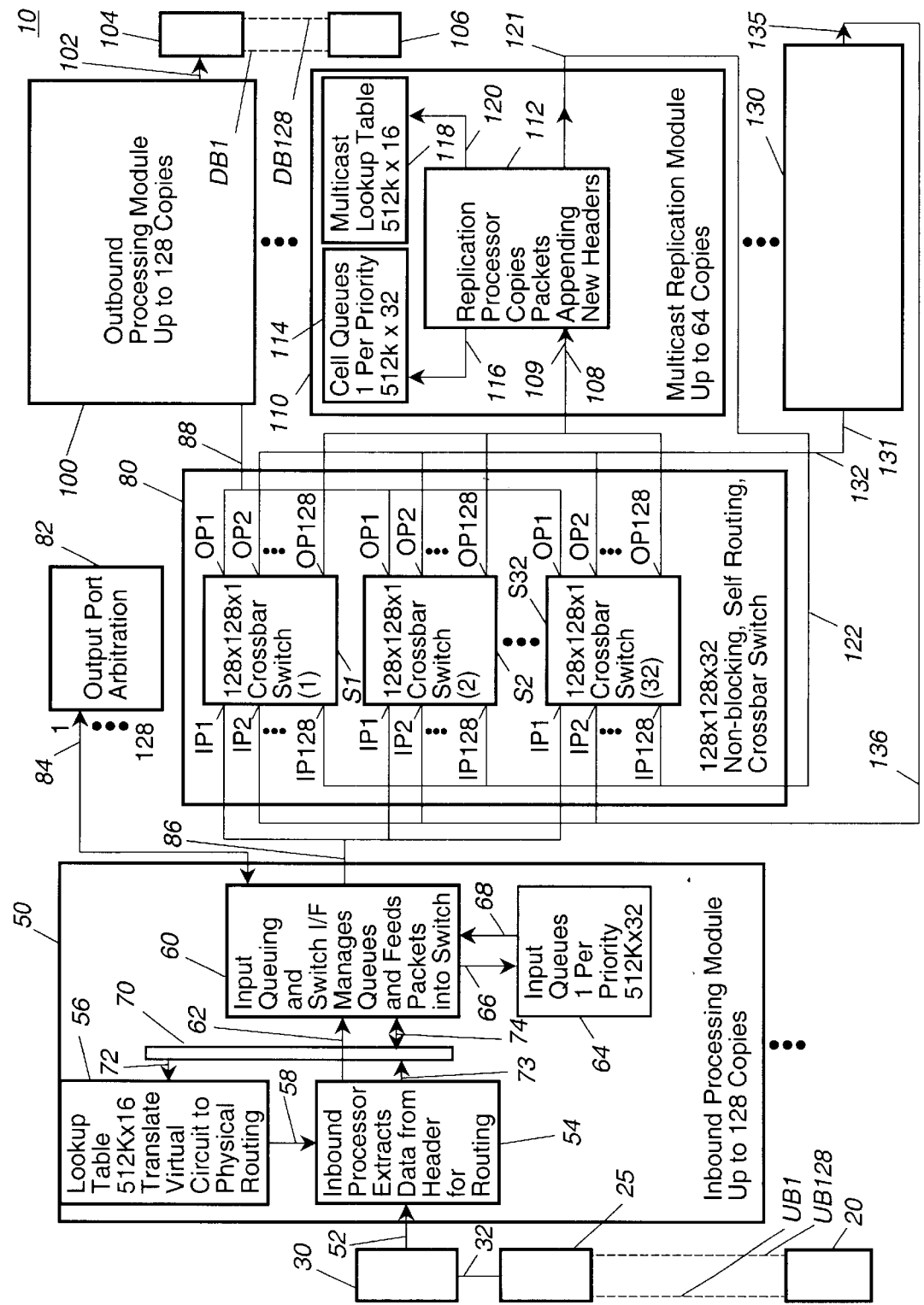

SATELLITE COMMUNICATION MULTICAST PROCESSING TECHNIQUES USING MULTICAST REPLICATION AND OUTBOUND PROCESSING

CROSS-REFERENCE TO RELATED APPLICATIONS

This is a continuation-in-part of U.S. application Ser. No. 09/236,682, filed Jan. 25, 1999, now U.S. Pat. No. 6,240,075.

BACKGROUND OF THE INVENTION

The present invention relates generally to a satellite communication system capable of multicast processing, and more particularly, relates to such a system in which the capacity of the multicast processing can be scaled to meet different requirements.

Modern communications networks carry staggering amounts of information. Increasingly, that information is transmitted through communication satellites. A single satellite may have, for example, the equivalent of 30 or more uplink transponders, each able to receive an uplink signal with a bandwidth of 250 MHz. The resultant uplink data path may have a capacity of 8 to 60 gigabits per second or more.

Where a satellite is a link in a communications network, many individual ground stations may encode, modulate, and transmit uplink signals to the satellite. Each uplink signal may consist of hundreds of individual data channels each, for example, carrying data for a telephone conversation. Similarly, the downlink signals produced by the satellite and transmitted to ground stations often include data for hundreds of users.

Additionally, crosslink signals may transmit data between satellites.

Satellite (and terrestrial) communication systems divide the data traffic on the uplink, downlink, and crosslink signals into discrete pieces of information, and each discrete piece of information may subsequently be transmitted over different selected channels in the communication network. The discrete pieces of information are referred to, for example, as "frames" or "ATM packets", depending on the particular system. In past terrestrial systems, for example, the data packets may be Asynchronous Transfer Mode (ATM) cells.

Each ATM cell is a specifically formatted data packet that is 53 bytes long and includes 5 header bytes (called the "header") and 48 information bytes (referred to below as the "information payload"). The header contains necessary information for a network to transfer cells between nodes over an ATM connection.

Specifically, the header contains a logical address consisting of an 8-bit Virtual Path Identifier (VPI) and a 16-bit Virtual Channel Identifier (VCI). The header also contains a 4-bit Generic Flow Control (GFC), a 3-bit Payload type (PT), and a 1-bit Cell Loss Priority (CLP) indicator. The header is error-protected by a 1-byte header error check (HEC) field.

The VPI/VCI field of an ATM header cell contains ATM address information. A virtual channel is used for the unidirectional transport of ATM cells, each channel having associated with it a VCI value. A virtual path (VP) is an aggregate bundle of virtual channels (VCs). These paths have associated VPI values, each VPI value identifying a bundle of one or more VCs. Because two different VCs belonging to two different VPs at a given interface may have the same VCI value, a VC is only fully identified at an interface if both its VPI and VCI values are indicated. Thus, the ATM address field is divided into two subfields. The first byte contains the VPI. The information in this field is used to switch virtual paths consisting of groups of virtual channels. The second byte contains the VCI, used to switch virtual channels. The information in the VCI identifies a single virtual channel on a particular virtual path.

Connection to an ATM network is a shared responsibility. The user and network provider must agree as to the support of application bandwidth demands and other traffic characteristics that will be provided. To further one aim of such an agreement, that is assurance that the integrity of the transmitted data packets is maintained, network users categorize cells according to Quality of Service (QoS) classes. QoS is defined by specific parameters for cells that conform to a particular traffic application. Traffic parameters are negotiated between a user and a network provider, and the user's input cells are monitored to ensure that the negotiated traffic parameters are not violated these parameters can be directly observed and measured by the user. QoS is defined on an end-to-end basis, an end, for example, being an end workstation, a customer-premises network, or a private or public ATM user-to-network. QoS is defined in terms of any number of measurement outcomes.

The measurement outcomes used to defined ATM performance parameters include successful cell transfer, errored cell transfer, lost cell, misinserted cell, and severely errored cell block. These performance parameters correspond to the generic QoS criteria of accuracy, dependability, and speed. Measurements of cell error ratio, severely errored cell block ratio, and cell misinsertion rate correspond to the QoS criterion of accuracy; measurements of cell loss ratio correspond to the QoS criterion of dependability; and measurements of cell transfer delay, mean cell transfer delay, and cell delay variation correspond to the QoS criterion of speed.

Cell error ratio (CER) is defined as the number of errored cells divided by the sum of successfully transferred cells and errored cells. Severely errored cell block ratio is defined by the total transmitted cell blocks. Cell misinsertion rate (CMR) is the number of misinserted cells divided by a specified time interval. Cell loss ration (CLR) is defined as lost cells divided by transmitted cells. Cell transfer delay is the elapsed time between a cell exit event at a measurement point and a corresponding cell entry event at another measurement point for a particular connection.

The cell transfer delay between two measurement points is the sum of the total inter-ATM node transmission delay and the total ATM node processing delay between the measurement points. Mean cell transfer delay is the average of a specified number of absolute cell transfer delay estimates for one or more connections. Cell delay variation is a measure of cell clumping, i.e., how much more closely cells are spaced than the nominal interval. Cell clumping is an issue because if too many cells arrive too closely together, cell buffers may overflow.

QoS classes are defined with pre-specified parameter threshold values. Each QoS class provides performance to an ATM virtual connection as dictated by a subset of ATM performance parameters. Additional details on ATM cell headers and QoS classes may be found in numerous references including *ATM Theory and Application*, (David E. McDysan & Darren L. Spohn, McGraw-Hill, Inc. 1995).

The use of QoS classes for ATM switches assures the integrity of the data packets. In addition, in most applications (where capacity generates revenue), one significant performance factor is the amount of information that is passed through the communication system (i.e., throughput). Generally, the higher the data throughput, the higher the revenue potential.

In the past, a bar to implementing a high throughput space-based switch was that an earth terminal could only receive information in a particularly configured downlink at any given moment in time. The downlink configuration depends on several parameters including, for example, frequency, coding, and the polarization of the downlink at the time the satellite transmits the information. Unlike information transmitted terrestrially, not every earth terminal may receive information in every downlink, because earth terminals are only configured to receive a particularly configured downlink at any given moment in time.

Thus, space-based systems, unlike terrestrial systems, face unique challenges in their delivery of information to ground stations. In other words, past terrestrial networks did not provide a suitable infrastructure for communications satellites.

Furthermore, revenue generated from operation of satellite communication systems is affected by considerations of weight and power consumption of the switch used in the satellite communication system. In a space-based implementation, higher weight and increased power consumption in the switch translates to higher spacecraft and launch costs and potential for reduced throughput. These, in turn, may have the effect of lowering potential revenue. Thus, cell switch features which, when implemented, minimize weight and power consumption of the switch are desirable because such added features functionality do not adversely affect the bottom line.

One such feature is that of providing a multicast capability. The use of multicast in a cell switch allows sending the same data to a selectable number of destinations. This feature addresses inefficient use of bandwidth in terrestrial switches. Prior to multicast feature availability, a broadcast function was commonly used, which sent the same data to all possible destinations. With the implementation of multicast, only those destinations requiring the data received it, making unused bandwidth available for data packet transmission.

Multicast capability as implemented in terrestrial based switches is inappropriate for use in satellite communications systems, however, due to its cost, weight, and complexity. Nonetheless, the need for multicast functionality in spaced-based cell switches is particularly important because if available, it would serve to maximize the efficient use of uplink, downlink and crosslink bandwidth.

Without on-board satellite multicast capability, replication must be performed on the ground, with multiple copies sent through the uplink. Thus, because a source terminal is required to send the same data repeatedly using this replication strategy, uplink bandwidth is wasted. Similarly, with only a broadcast capability in the space-based switch, data would be sent to all downlink and crosslink beams, resulting in wasted downlink and crosslink bandwidth. Multicast capability in a space-based switch would allow data to be sent only to those destinations requiring it, thus optimizing bandwidth. Whether used in terrestrial or space-based systems, multicast ideally supports modern network standards, such as ATM and ATM's QoS parameters (as discussed above).

Depending on the target business plan, the user may choose to implement the multicast capability in a scalable and modular fashion as a trade to having more or less dedicated uplink and downlink bandwidth.

One aspect affecting weight and power of a cell switch is the number of data packet storage units, for example, queue buffers, used to implement the multicast feature. In the past, multicast has been implemented using multiple queue buffers (e.g., one on the in-bound side of the switch, and one on the outbound side). The queue buffers store ATM cells until they are extracted for subsequent processing and eventual routing to specified destinations. This multiple queue buffer implementation is designed to support ATM QoS parameters. Though a multiple buffer implementation may be efficient for the terrestrial switches, this approach is undesirable in spaced-based switches. This is so because such an implementation unnecessarily increases the weight and power consumption of the switch. Increased weight and power translates into higher spacecraft and launch costs and reduced throughput, which can translate into a loss of revenue. Additionally, increased complexity may result in lower reliability.

Terrestrial communication networks have been moving in recent years towards ATM standards. Often, it is desirable to link the terrestrial communication networks through a satellite system. In the past, however, there has been no efficient multicast capability available for space-based implementation, thus barring the progress of globally providing reliable and economic information transfer.

A need exists in the satellite communication industry for efficient multicast capability in a commercial satellite system using a scalable and modular multicast architecture such that an appropriate number of multicast modules may be employed to satisfy the requisite multicast capacity.

BRIEF SUMMARY OF THE INVENTION

It is the object of the present invention to provide a satellite multicast switching architecture that is scalable and modular to uniquely satisfy the need of different satellite systems. The multicast capacity of each system is based on their projected business and revenue plans.

It is also an object of the present invention to provide a satellite multicast switching technique with the ability to adapt a common design to keep non-recurring engineering costs to a minimum.

According to a preferred embodiment of the present invention, a switch is provided for receiving data cells at a set of input ports. The received data cells which include a multicast routing code are switched to a first set of output ports or nodes and received data cells which effectively omit a multicast routing code are switched to al second set of output ports or nodes. The data cells switched to the first set of output ports or nodes are copied or replicated, and the multicast routing code is effectively omitted from the replicated data cells which are then coupled to the input ports so that the replicated data cells are transmitted to the second set of output ports or nodes of the switch means. Outbound processing is performed on the data cells coupled to the second set of output ports or nodes in order to prepare the data cells for transmission, typically by a downlink of a satellite.

According to a modification of the previous embodiment, inbound processing is also provided whereby the multicast routing code is written into the data cells in the satellite before they are transmitted to the switch means.

BRIEF DESCRIPTION OF DRAWING

These and other advantages and features of the invention will appear for purposes of illustration, but not of limitation, in connection with the accompanying drawing, wherein the FIGURE is a schematic block diagram of a preferred form of the invention.

DETAILED DESCRIPTION OF THE INVENTION

The objects of the invention are met in whole or in part by a method and apparatus for providing multicast in a satellite communication system. In the preferred embodiment, data (ATM cells in this case) enters into a processor switch from a demodulator output at the switch inbound modules. A cell header is extracted and used as an index to the inbound lookup table. The inbound lookup table returns with the following information: a routing tag which guides the cell through the switch fabric, priority information which is associated with the cell QoS, as well as a new VPI or VCI header with which the cell will travel to its next destination. Once the operation of the lookup table is completed, the cell is queued in the inbound module by its priority, and awaits transfer to its destination port through the switch fabric.

Two paths are available for the cell based on the header information. A unicast cell transfer takes the cell through the switch fabric to the destined outbound module, where the cell is queued for downlink processing. In a multicast cell transfer, the cell leaves the inbound module and is received by a multicast module. The multicast module processes the cell in much of the same manner as an inbound module. The header is extracted and used as an index to a multicast lookup table. The multicast lookup table contains similar information as the inbound lookup table, such as a routing tag and a new VPI/VCI header. But the table also stores the number of copies which need to be made for this particular multicast cell. Like the inbound module, the cell is queued after lookup table processing for an opportunity to transfer to the appropriate outbound module for downlink processing or to a different multicast module for further multicast replication processing. Thus, if the replicated cell is to be transferred to an outbound module, the multicast routing tag is effectively omitted from the cell, such as by changing the multicast routing tag to an output module-routing tag.

The multicast capability within the system can be further expanded by using multiple multicast modules. To illustrate this point, a cell is routed from a given, inbound module to a multicast module, as indicated by the routing tag. This multicast module will then replicate the cell, and make it available for arbitration and routing through the switch fabric. One or more of the replicated cells may have a routing tag that routes it to another multicast module, therefore allowing expanded multicast replication to happen with two modules simultaneously. This method can be further expanded to multiple modules, thereby demonstrating the scalability of this multicast architecture.

By using the foregoing techniques, multicast processing can be segregated from outbound processing so that the multicast processing capability of the system can be scaled to meet different requirements. More specifically, multicast replication can be performed in a module separate from the module in which outbound processing is performed. As a result, the number of multicast replication modules can be scaled depending on the needs of a customer.

In this architecture, the multicast modules sit on the output ports of the switch fabric just like the outbound processing modules, so that multicast replication modules can be added as needed without changing the structure of the switch module or the output processing module. Isolating the processing of the multicast cells into multicast replication modules allows the inbound and outbound modules to operate at a higher utilization level since they do not need to reserve bandwidth for replicating or filtering data cells as might be required by integrated approaches.

The foregoing techniques also allow standardized port interfaces to the switch which allows scalability and modularity when trading off between point-to-point vs. point-to-multipoint capacity. The scalability allows the system to eliminate or minimize the need for multicast replication modules if the system chooses to perform the multicast processing by or from a source terminal. The foregoing techniques also provide the ability to assign different quality of service (QoS) classes to different destination and remove any specific limit to the number of multicast destinations.

The components illustrated in the FIGURE are preferably incorporated into an orbiting communication satellite 10.

The preferred embodiment places on board satellite 10 a conventional uplink receiver 25, a conventional demodulator 30, an inbound processing module 50, a switch module 80, an outbound processing module 100, a downlink transmitter 104, and multicast replication modules 110 and 130. Additional information about multicast replication modules 110 and 130 is described in the application entitled "Method And Means For Serial Cell Replication For Multicast In A Cell Switch" filed herewith in the names of Lisa A. Moy-Yee, et al. under TRW Docket No. 22-0050, assigned to the same assignee as this application and incorporated by reference into this application.

Additional information about inbound processing module 50 and switch module 80 is described in the application entitled "Satellite Communication Routing Arbitration Techniques," Ser. No., 09/236,682, filed in the names of Scott M. Takahaski et al. on Jan. 25, 1999, assigned to the same assignee as this application and incorporated by reference into this application.

Satellite 10 receives 128 uplink beams of radio frequency signals UB1–UB128 from a group of ground-based communication stations collectively shown as 20. Uplink beams UB1-UB128 are received and processed by conventional uplink receiver 25 and are transmitted to conventional demodulator 30 over a lead 32.

It is noted that although the preferred embodiment describes the invention in connection with ATM cells, the invention is not limited to ATM cells or ATM networks. The invention may be implemented with any other suitably formatted data packets. A data packet is typically comprised of an information payload and a header. The header includes the portion of the data packet that contains information pertinent to that data packet. The header may be prepended, appended, or even interspersed in the information payload depending upon the data packet format. The format and size of the data packet may even be temporarily altered during transmission to allow for more routing and processing information.

Returning to the FIGURE, inbound processing module 50 receives ATM data cells from demodulator 30 over an input bus 52. It is noted that inbound processing module 50 may receive cells from multiple demodulators over multiple input buses. Module 50 includes a processor 54 which processes the header data from an ATM cell. Processing of an ATM cell may, for example, include adding a routing tag or code, priority, downlink code rate, and other information based on data received from a lookup table 56. This may alter the size of the ATM cell by expanding it. Processing may also include replacing part or all of the ATM cell header with information received from the lookup table 56. The processor 54 may use information from the cell's header to identify the corresponding entry in the lookup table 56. The inbound processing module will then route the cell through the switch fabric module 80 directly to the module indicated by the routing tag or code. If the cell requires multicast processing, the routing tag will identify one of a multiplicity of multicast replication modules 110 or 130 and the cell will be routed accordingly. If a cell does not require multicasting, the routing tag will, identify one of multiple outbound modules 100 and the cell will be routed through the switch fabric module 80 accordingly.

Before a cell is sent through the switch fabric 80, it may be stored in an input queue 64. Additionally, according to the preferred embodiment, an inbound module requires permission to send a cell through the switch fabric 80. This permission is granted or denied by the output port arbiter 82 and depends upon the requests from other inbound modules 50 and multicast modules 110 and 130. When permission is granted, the cell is sent through the switch fabric 80 to its proper destination. When permission is denied, the request is repeated until the request is granted.

At the appropriate time, the ATM cells are transmitted over a bus 86 to one of the switch fabric input ports IP1–IP128 of crossbar switches S1–S32 of switch fabric 80. The switches S1–S32 provide full connectivity between switch fabric input ports or nodes IP1–IP128 and switch fabric output ports or nodes OP1–OP128, such that any switch fabric input port IP1–IP128 may be connected to any switch fabric output port OP1–OP128. The switches may use the routing tags to indicate which switch fabric input ports IP1–IP128 should be connected to which switch fabric output port OP1–OP128 at any given time.

Switch fabric output ports OP1–OP128 are connected to outbound modules 100 and multicast replication modules 110 and 130. For example, in the FIGURE, the switch fabric output port OP1 is connected to outbound module 100 through bus 88 and the switch fabric output port OP128 is connected to multicast module 110 through bus 108.

When a multicast replication module 110 receives a cell, it may place the cell in a queue memory 114. The replication processor 112 will copy or replicate the multicast cell such that there are as many copies of the cell as needed. Processing in the multicast module may include using a multicast lookup table 118 to provide a routing tag or code, priority, downlink code rate, and other information for each copy or replication of the multicast cell. Each copy of the cell, after a multicast replication module 110 or 130 has processed it, will be routed through the switch fabric 80 to its proper destination. For example, in the FIGURE, multicast replication module 110 is connected to switch fabric input port IP128 of each of the crossbar switches S1–S32 through bus 121.

In the preferred embodiment, each copy or replication of a multicast cell will have a unique routing tag which will cause the replications to be routed through the switch fabric 80 to unique outbound modules 100. In the preferred embodiment, the multicast module requires permission to send a cell through the switch fabric 80. This permission is granted or denied by the output port arbiter 82 and depends upon the requests from other inbound modules 50 and multicast modules 110 and 130. When permission is granted, the cell is sent through the switch fabric 80 to its proper destination. When permission is denied, the request is repeated until the request is granted.

In a well-known manner, the outbound processing module prepares the cells for transmission over one of transmitting beams DB1–DB128. After processing by module 100, the ATM cells are transmitted through an output 102 to a modulator of the downlink transmitter circuitry 104 of satellite 10.

According to the preferred embodiment, additional multicast replication modules may be added to satellite 10 as required by a customer's need for multicast replication processing. For example, an additional multicast replication module 130 identical to module 110 may be added as shown in order to enable simultaneous multicast processing by modules 110 and 130. Module 130 includes an input 131 connected to bus 132 which is connected to output nodes or ports OP2 of each of the crossbar switches S1–S32. Replication module 130 also includes an output 135 which is connected to input ports IP2 of each of the crossbar switches S1–S32 over a bus 136. Additional details about multicast replication modules 110 and 130 are provided in the related application previously identified.

Preferably, inbound processor 54 adds information to each ATM cell requiring multicast processing information indicating whether the cell is to be processed by module 110 or module 130. However, processor 54 can be programmed so that an algorithm will allocate an ATM cell requiring multicast processing to the next available multicast replication module.

According to another feature, processor 54 may add information indicating quality of service for the ATM cells as they are processed from lookup table memory 56.

Those skilled in the art will recognize that the preferred form of the invention may be altered or modified without departing from the true spirit and scope of the invention as defined in the accompanying claims. The reader of the ATM cell header need not be in switch module 80, but also can be located in other modules. The nodes or ports described in connection with switch module 80 can be moved to other locations. Switch module 80 may comprise a bus structure in which modules 100, 110 and 130 take the form of peripheral devices addressed by the bus.

What is claimed is:

1. In a satellite communication system, improved apparatus for performing multicast switching on data cells comprising:

switch means for receiving said data cells at a set of input ports, for directing said data cells including a multicast routing code to a first set of output ports and for directing said data cells effectively omitting said multicast routing code to a second set of output ports;

multicast replication means coupled to said first set of output ports for replicating said data cells requiring multicast processing, for effectively omitting said multicast routing code from said replicated data cells and for coupling said replicated data cells to said set of input ports so that said replicated data cells are transmitted to said second set of output ports; and outbound processing means coupled to said second set of output ports for processing for transmission said data cells effectively omitting said multicast routing code, whereby multicast processing can be segregated from outbound processing so that the multicast processing capacity of the system can be scaled to meet different requirements.

2. Apparatus, as claimed in claim 1, and further comprising inbound processing means for writing said multicast routing code into said data cells requiring multicast processing and coupling said data cells to said set of input ports.

3. Apparatus, as claimed in claim 2, wherein said inbound processing means is located in a first module and said multicast replication means is located in a second module separate from said first module.

4. Apparatus, as claimed in claim 3, wherein said outbound processing means is located in a third module separate from said first and second modules.

5. Apparatus, as claimed in claim 2, wherein said multicast replication means comprises a first multicast replication means and a second multicast replication means, wherein said inbound processing means comprises means for writing into a first one of said data cells a first multicast routing code and for writing into a second one of said data cells a second multicast routing code, and wherein said switch means comprises means for switching said first data cell to said first multicast replication means and for switching said second data cell to said second multicast replication means, whereby multicast replication can be conducted simultaneously on said first and second data cells.

6. Apparatus, as claimed in claim 2, wherein said inbound processing means comprises a lookup table for storing said multicast routing code.

7. Apparatus, as claimed in claim 1, wherein said multicast replication means comprises means for inserting into said replicated data cells a routing code and a virtual channel or virtual path code.

8. Apparatus, as claimed in claim 1, wherein said switch means comprises a switch module comprising a first input port suitable for receiving said data cells including said multicast routing code, a second input port, third input port, a first output port, a second output port and a third output port, wherein said outbound processing means comprises an outbound processing module coupled to said first output port, wherein said multicast replication means comprise a first multicast replication module coupled to said second input port and said second output port and comprises a second multicast replication module coupled to said third input port and said third output port, whereby the number of multicast replication modules can be scaled to meet different requirements and said multicast replication modules can share a switch module with outbound processing module so that multicast replication modules can be added as needed without changing the structure of the switch module or the outbound processing modules.

9. Apparatus, as claimed in claim 1, wherein said multicast replication means comprises:
means for storing data representing the number of times said data cells are to be replicated; and
means for replicating said data cells according to said data.

10. In a satellite communication system, improved apparatus for performing multicast switching on data cells comprising:
a switch comprising
a set of input ports,
a first set of output ports,
a second set of output ports, and
a coupler of said data cells including a multicast routing code to said first set of output ports and of data cells effectively omitting said multicast routing code to said second set of output ports;
a multicast cell replicator comprising
an input coupled to said first set of output ports,
a first memory storing said data cells to be replicated,
a replication processor coupled to said first memory and effectively omitting said multicast routing code from said replicated data cells, and
an output coupled to said replication processor and said set of input ports so that replicated data cells are transmitted to said second set of output ports; and
an outbound data cell processor coupled to said second set of output ports, whereby multicast processing can be segregated from inbound processing and outbound processing so that the multicast processing capacity of the system can be scaled to meet different requirements.

11. Apparatus, as claimed in claim 10, and further comprising an inbound data cell module comprising:
a second memory storing said inbound data cells;
an inbound processor writing said multicast routing code into said data cells requiring multicast processing; and
an output coupled to said inbound processor and to said set of input ports.

12. Apparatus, as claimed in claim 11, wherein said multicast replicator is located in a second module separate from said inbound data cell module.

13. Apparatus, as claimed in claim 12, wherein said outbound data cell processor is located in a third module separate from said inbound data cell module and said second module.

14. Apparatus, as claimed in claim 11, wherein said multicast cell replicator comprises a first multicast cell replicator and a second multicast cell replicator, wherein said inbound processor writes a first multicast routing code into a first one of said data cells and writes a second multicast routing code into a second one of said data cells, and wherein said switch couples said first data cell to said first multicast replicator and couples said second data cell to said second multicast replicator, whereby multicast replication can be conducted simultaneously on said first and second data cells.

15. Apparatus, as claimed in claim 11, wherein said inbound data cell processor comprises a lookup table storing said multicast routing code identifying cells requiring multicast processing.

16. Apparatus, as claimed in claim 10, wherein said replication processor writes a routing code and a virtual channel or virtual path code into said replicated data cells.

17. Apparatus, as claimed in claim 10, wherein said switch comprises a switch module comprising a first input port suitable for receiving said data cells including said multicast routing code, a second input port, third input port, a first output port, a second output port and a third output port, wherein said outbound data cell processor is coupled to said first output port, wherein said multicast cell replicator comprises a first multicast replication module coupled to said second input port and said second output port and comprises a second multicast replication module coupled to said third input port and said third output port, whereby the number of multicast replication modules can be scaled to meet different requirements and said multicast replication modules can share a switch module with outbound data cell processor so that multicast replication modules can be added as needed without changing the structure of said switch module or said outbound data cell processors.

18. Apparatus, as claimed in claim 10, wherein said multicast cell replicator comprises a store of data representing the number of times said data cells are to be replicated, and wherein said replication processor replicates said data cells according to said data.

19. In a satellite communication system including a first set of nodes and a second set of nodes, an improved method of performing multicast switching on data cells comprising the steps of:
switching said data cells including a multicast routing code to said first set of nodes and switching said data cells effectively omitting a multicast routing code to said second set of nodes;

multicast processing said data cells switched to said first set of nodes by replicating said data cells requiring multicast processing;

effectively omitting said multicast routing code from said replicated data cells;

switching said replicated data cells to said second set of nodes; and outbound processing said data cells switched to said second set of nodes for transmission by said satellite communication system, whereby multicast processing can be segregated from outbound processing so that the multicast processing capacity of said system can be scaled to meet different requirements.

20. A method, as claimed in claim 19, and further comprising the step of processing inbound data cells by inserting a multicast routing code into said data cells requiring multicast processing.

21. A method, as claimed in claim 20, wherein said step of processing inbound data cells comprises the step of storing said multicast routing code for identifying cells requiring multicast processing in a lookup table.

22. A method, as claimed in claim 19, wherein said step of multicast processing comprises the step of inserting into said replicated cells a physical routing code and a virtual channel or virtual path code.

23. A method, as claimed in claim 19, wherein said step of multicast processing comprises the steps of:

storing data representing the number of times said data cells are to be replicated; and replicating said data cells according to said data.

* * * * *